(12) United States Patent
Bland et al.

(10) Patent No.: US 7,069,477 B2
(45) Date of Patent: Jun. 27, 2006

(54) METHODS AND ARRANGEMENTS TO ENHANCE A BUS

(75) Inventors: Patrick Maurice Bland, Raleigh, NC (US); Jefferey B. Williams, Raleigh, NC (US); Brandon R. Wyatt, Raleigh, NC (US); Kit H. Wong, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 10/283,994

(22) Filed: Oct. 30, 2002

(65) Prior Publication Data

US 2004/0088604 A1    May 6, 2004

(51) Int. Cl.
*G06F 11/00*    (2006.01)
(52) U.S. Cl. ............................ 714/43; 714/56; 714/25; 714/44
(58) Field of Classification Search ................. 714/43, 714/56, 25, 44; 710/301–304
See application file for complete search history.

(56) References Cited

U.S. PATENT DOCUMENTS 5,852,617 A * 12/1998 Mote, Jr. ..................... 714/726
5,930,496 A *  7/1999 MacLaren et al. ............ 703/23
6,032,271 A    2/2000 Goodrum et al.
6,070,207 A *  5/2000 Bell ........................... 710/302
6,141,711 A * 10/2000 Shah et al. ................. 710/302
6,363,452 B1 *  3/2002 Lach .......................... 710/316

FOREIGN PATENT DOCUMENTS

| JP | 58-033743    | 2/1983  |
| JP | 58-203533    | 11/1983 |
| JP | 07-334433    | 12/1995 |
| JP | 2001-005743  | 1/2001  |

* cited by examiner

*Primary Examiner*—Robert Beausoliel
*Assistant Examiner*—Charles Ehne
(74) *Attorney, Agent, or Firm*—Joseph P. Lally; Martin McKinley (57) ABSTRACT

Methods and arrangements to enhance a bus are disclosed. Embodiments may test bus segments, device interfaces, couplings between devices and device interfaces for bit errors. Several embodiments generate a test signal in response to coupling a device to a device interface, transmit the test signal on the bus, and generate an error signal when the bus signal at the device interface is different from the anticipated bus signal. The test signal may comprise one or more patterns of bits configured to identify one or more faults associated with a bus segment, a bus switch of the device interface to isolate the adapter card from the bus, and circuitry or buffers of the adapter card as plugged into the slot of the device interface. In many of these embodiments, a bus signal is determined at the bus-side and/or slot-side of the device interface.

23 Claims, 5 Drawing Sheets

METHODS AND ARRANGEMENTS TO ENHANCE A BUS

FIELD OF INVENTION

The present invention is in the field of error detection and bus isolation. More particularly, the present invention provides methods and arrangements to detect errors and/or faults on a bus such as bus switch and buffer errors, adapter card errors, and bus shorts for hot-plug adapter cards or the like.

BACKGROUND

Server applications often require a server to remain in operation continuously. For example, an "On-Forever" server has one or more peripheral component interconnect (PCI) buses with device interfaces to attach PCI adapter cards to the buses while the server remains in operation. In particular, the device interface includes a power controller and a bus switch connected to a PCI slot to isolate the connections of the PCI slot until an adapter card, often referred to as a hot-plug adapter card, is inserted into the slot.

After an adapter card is inserted into an available slot, a hot-plug controller determines the power and frequency requirements of the adapter card based upon requirements of other adapter cards connected to the bus and selects the power and frequency for the bus. When the power and frequency requirements have been established, the power controller applies power to the adapter card. Then the controller activates the adapter card by connecting the adapter card to the bus via the bus switch. A PCI bridge coordinates communication between the server and the adapter card.

The power controller regulates power to the adapter cards connected to the bus and recognizes over current faults but the bus remains vulnerable to other types of faults. For example, the power controller does not recognize faults associated with bus switch and buffer problems, adapter cards problems, and bus shorts like faults caused by failure prone connectors and mechanically misplugged adapter cards. Such faults interfere with the communication between the bridge and adapter cards and can, for instance, result in a system crash. Further, the power controller does not determine the source of a fault that causes the bus segment to become inoperative and the server to crash, so a technician has to verify the correct operation of each of the adapter cards, bus switches, and bus segments to determine the source of the fault and repair the server.

SUMMARY OF THE INVENTION

The problems identified above are in large part addressed by methods and arrangements to test bus segments, device interfaces, couplings between devices and device interfaces for bit errors. Embodiments may determine a test signal in response to coupling a device to a device interface, transmit the test signal on the bus, and generate an error signal when the bus signal at the device interface is different from the anticipated bus signal. More particularly, some embodiments transmit the test signal to a bridge and the bridge transmits the test signal to a device interface via the bus. The test signal may comprise one or more patterns of bits configured to identify one or more faults associated with a bus segment, a bus switch to isolate the adapter card from the bus, and an adapter card or a buffer of the adapter card.

In many of these embodiments, a bus signal is determined at the bus-side and/or slot-side of the device interface. Further, the bus signal may be determined with the bus isolated from an adapter card and/or with the bus communicatively coupled with the adapter card. When a bus signal at the device interface differs from a comparison signal anticipated to be a response to the test signal, such as the test signal, an error signal may be generated.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Methods and arrangements to enhance a bus are disclosed. Embodiments may test bus segments, device interfaces, couplings between devices, such as adapter cards, and device interfaces for bit errors. Several embodiments generate a test signal in response to coupling a device to a device interface, transmit the test signal on the bus, and generate an error signal when the bus signal at the device interface is different from the anticipated bus signal. More particularly, some embodiments transmit the test signal to a bridge and the bridge transmits the test signal to a device interface via the bus. The test signal may comprise one or more patterns of bits configured to identify one or more faults associated with a bus segment, a bus switch of the device interface to isolate the adapter card from the bus, and a circuit, register, or buffer of the adapter card as plugged into the slot of the device interface. In many of these embodiments, a bus signal is determined at the bus-side and/or slot-side of the device interface. Further, the bus signal may be determined with the bus isolated from the device and/or with the bus communicatively coupled with the device. When a bus signal at the device interface differs from the signal anticipated to be a response to the test signal an error signal may be generated.

Figure 1:
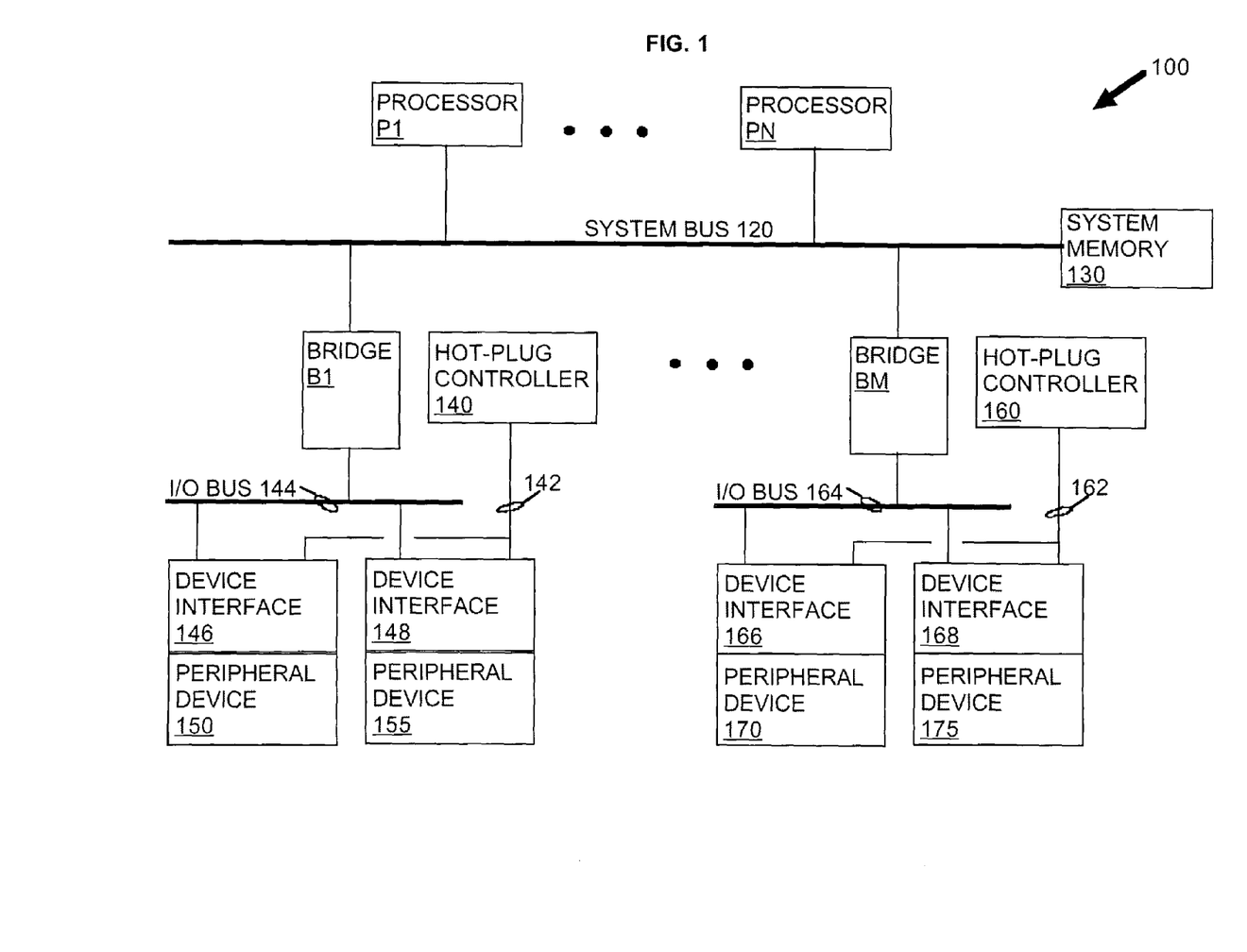
FIG. 1 depicts an embodiment an embodiment of a system comprising one or more processors, system memory, and one or more bridges for hot-plug devices to detect errors and/or faults on an input-output (I/O) bus.

Turning now to the drawings, FIG. 1 depicts an embodiment of a system 100 comprising one or more processors P1 through Pn coupled with system memory 130 via system bus 120, and one or more bridges B1 through Bm coupled with hot-plug controllers 140 and 160 to facilitate coupling peripheral devices 150, 155, 170, and 175 to system bus 120 via device interfaces 146, 148, 166, and 168 while system 100 continues to operate. System 100 may detect errors and/or faults on input-output (I/O) buses 144 and 164 such as bus switch and buffer errors, adapter card errors, and bus shorts or the like after coupling the peripheral devices 150, 155, 170, and 175 but before full activation of peripheral devices 150, 155, 170, and 175. In some embodiments, system 100 may determine the source of the fault, isolate the fault or the corresponding bus, and communicate the fault to a user via a hardware and/or software user interface. In other embodiments, the I/O bus 144 and 164 corresponding to the source of a fault may be disabled.

Processors P1 through Pn may be implemented with any of a variety of processors such as general purpose microprocessors. In some embodiments, processors P1 through Pn comprise processors designed for servers and service requests from peripheral devices 150, 155, 170, and 175, via bridges B1 and Bm. For example, one or more of processors P1 through Pn may execute an applet such as an operating system (O/S) applet to issue diagnostic commands to hot-plug controllers 140 and 160. In many of these embodiments, the applet may instruct the processor(s) P1 through Pn to set up or select different test signals such as data or bit patterns for use by the hot-plug controllers 140 and 160. The test signals may be configured to determine bus faults or component faults that may inhibit proper operation. For instance, when a fault is identified in a peripheral device 150, 155, 170, and 175 such as an adapter card, the adapter card's activation may be prohibited. On the other hand, when a fault is identified in a bus segment or in a bus switch of device interface 146, the corresponding I/O bus 144 may be disabled to avoid crashing system 100.

System memory 130 can be implemented with volatile storage elements such as an array of dynamic random access memory (DRAM) components and may comprise data accessed by peripheral devices 150, 155, 170, and 175, via bridges B1 and Bm. In further embodiments, system memory 130 may comprise read only memory (ROM) and/or nonvolatile read/write memory.

Bridges B1 through Bm couple with I/O buses 144 through 164 respectively to coordinate communication on I/O buses 144 through 164 and between I/O buses 144 through 164 and system bus 120. Bridges B1 through Bm may facilitate communication between system bus 120 and hot-plug controllers 140 through 160. For instance, bridge B1 may arbitrate access to I/O bus 144 between peripheral device 150 and peripheral device 155.

In the present embodiment, bridge B1 transmits test signals to device interfaces 146 and 148 on I/O bus 144 to detect faults. For example, bridge B1 may receive a test signal such as a pattern of bits along with an indication to transmit the test signal to device interface 148 or peripheral device 155 via bus I/O 144. Bridge B1 can transmit the test signal and an address recognizable by device interface 148 or peripheral device 155. In some embodiments, addressing the transaction to device interface 148 facilitates testing peripheral device 155 with the test signals and bus isolation switches of device interface 148.

Hot-plug controllers 140 and 160 may function similarly to detect, identify and isolate faults appearing when a peripheral device is coupled with a bus while system 100 remains in operation. For instance, hot-plug controller 140 may couple peripheral device 150 to I/O bus 144 while system 100 remains in operation and facilitate detection of faults associated with I/O bus 144 and peripheral device 150 prior to full activation of peripheral device 150. In particular, hot-plug controller 140 determines a test signal for I/O bus 144 in response to coupling peripheral device 150 with I/O bus 144 based upon instructions received from an O/S applet. In some embodiments, the instruction describes a test to be performed and hot-plug controller 140 determines one or more test signals associated with the test. In some of these embodiments, hot-plug controller 140 generates a test signal by combining one or more bit patterns. In other embodiments, the O/S applet transmits a test signal to hot-plug controller 140. Then hot-plug controller 140 can issue an instruction to bridge B1 to drive the test signal on I/O bus 144.

Hot-plug controller 140 may also transmit a comparison signal representing an anticipated response to transmission of the test signal on I/O bus 144 to device interface 146 and/or 148 via a secondary bus 142 to determine bit errors resulting from a fault. For example, peripheral device 150 may be inserted into a slot of device interface 146 and remain isolated from I/O bus 144. Processor P1 may execute an O/S applet to issue commands to hot-plug controller 140. In response to the commands, hot-plug controller 140 may transmit a test signal to bridge B1 and to device interface 146 via secondary bus 142. Bridge B1 may transmit the test signal to device interface 146.

In many embodiments, hot-plug controller 140 may transmit a comparison signal to device interface 146 that is different from the test signal to determine if a fault affected the data transmitted from bridge B1 to device interface 146. In such embodiments, the test signal may interact with peripheral device 150 by storing and/or retrieving data from a buffer and/or register of peripheral device 150. Further, hot-plug controller 140 receives an error signal from device interface 146 in response to the test signal and comparison signal to describe a difference between the bus signal on I/O bus 144 at device interface 146 and the comparison signal. In some embodiments, hot-plug controller 140 receives the error signal when a fault is detected. In other embodiments, hot-plug controller 140 receives the signal and determines whether a fault is associated with the error signal or forwards the error signal to an O/S applet for interpretation of the error signal.

Hot-plug controller 160 interacts with bridge Bm, device interfaces 166 and 168, and peripheral devices 170 and 175 via I/O bus 164 and bus 162 in a similar manner. In some embodiments, hot-plug controllers 140 and 160 may comprise logic to generate test signals without receiving commands and/or instructions from processors P1 through Pn or an O/S applet. In further embodiments, hot-plug controllers 140 and 160 may comprise a processor to execute software similar to the O/S applet.

Device interface 146 couples peripheral device 150 to I/O bus 144 and generates an error signal based upon a difference between the bus signal at device interface 146 and the comparison signal. In some embodiments, the bus signal is sampled at the bus-side of device interface 146 from I/O bus 144 to determine whether there is a fault between device interface 146 and bridge B1. In several embodiments, the bus signal is sampled at the slot-side of device interface 146 while peripheral device 150 remains isolated from I/O bus 144 to determine a fault associated with device interface 146. In such embodiments, an error signal can be generated by comparing the bus signal to the test signal to determine a difference or differences between the test signal as transmitted on I/O bus 144 and the bus signal received in response to transmitting the test signal. In further embodiments, the bus signal is sampled at the slot-side of device interface 146 while peripheral device 150 is coupled with I/O bus 144 to determine a fault associated with peripheral device 150. In these embodiments, an error signal can be generated by comparing the bus signal to the comparison signal.

In several embodiments, once an error is determined, the error may be displayed to a user in the form of a light coupled with device interfaces 166 and 168 or bridge B1 and Bm. In further embodiments, the error signals may be interpreted and the fault may be communicated to a user via a graphical user interface (GUI), an audio interface, and the like. For example, the O/S applet may retrieve the error signals from hot-plug controller 140, interpret the error signals, and display a message regarding the fault on a terminal associated with the system.

Figure 2:
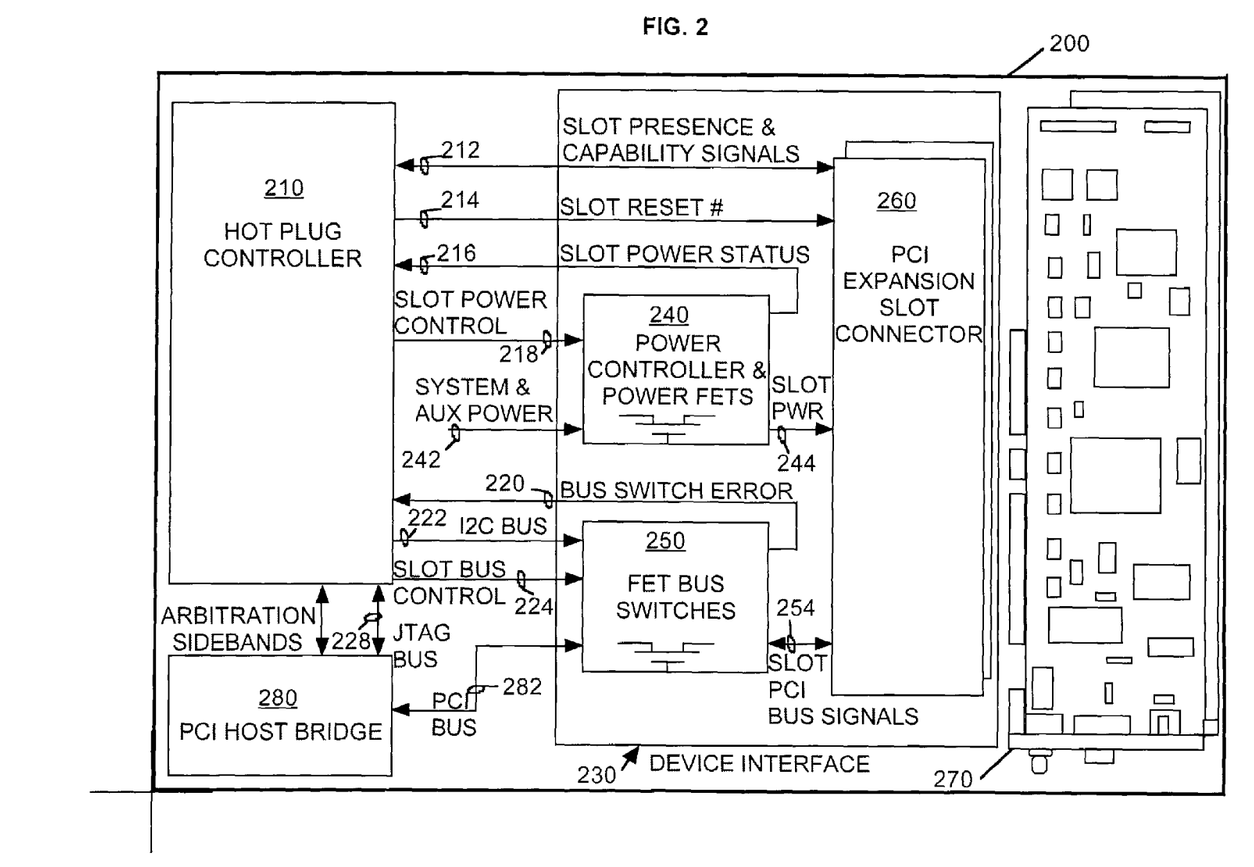
FIG. 2 depicts an embodiment of an apparatus comprising a hot plug controller, a PCI host bridge, a device interface, and an adapter card to detect errors and/or faults on a PCI bus.

Referring now to FIG. 2, there is shown the embodiment of an apparatus 200 comprising a hot-plug controller 210, a PCI host bridge 280, a device interface 230, and an adapter card 270 to detect errors and/or faults on a PCI bus 282. Hot-plug controller 210 may determine power and frequency capabilities of adapter card 270, instruct a power controller 240 to apply power to adapter card 270, and generate a test signal for PCI bus 282 in response to coupling adapter card 270 with PCI expansion slot connector 260. For example, hot-plug controller 210 receives a signal 212 from PCI expansion slot connector 260 of device interface 230 and comprises logic to determine that PCI expansion slot connector 260 is coupled with adapter card 270. In response, hot-plug controller 210 transmits a slot reset signal 214 and receives capability signals from adapter card 270. Hot-plug controller 210 then transmits a slot power control signal 218 to apply power for adapter card 270.

Power controller 240 of device interface 230 receives signal 218 and changes the state of power field effect transistors (FETs) to apply power from system and auxiliary power 242 to PCI expansion slot connector 260 via slot power 244. In some embodiments, power controller 240 may comprise circuitry to determine when power regulation is good and/or when an over current fault occurs. The status of the power regulation and over current fault can be transmitted to hot-plug controller 210 via slot power status 216.

After power is applied to and prior to full activation of adapter card 270, hot-plug controller 210 advantageously attempts to detect, identify, and isolate a fault or faults associated with PCI bus 282, device interface 230, and adapter cards coupled with device interface 230 such as adapter card 270. In particular, hot-plug controller 210 generates a test signal comprising a pattern of bits configured to identify a fault, such as a short on PCI bus 282, a malfunctioning bus switch of FET bus switches 250 a fault associated with adapter card 270, or a fault associated with the connection between adapter card 270 and device interface 230. The test signal is transmitted to PCI host bridge 280 via JTAG bus 228 and a comparison signal anticipated as a response to the test signal is transmitted to device interface 230 via I2C bus 222. The test signal is preloaded at the latched outputs of the boundary-scan registers connect to PCI host bridge 280 output pins and hot-plug controller 210 issues a JTAG EXTEST instruction via JTAG bus 228 to drive the test signal through the output pins. Hot-plug controller 210 may wait a number of cycles to capture an error signal 220 determined by device interface 230 based upon a bus signal on PCI bus 282 after transmission of the test signal. Error signal 220 is transmitted to hot-plug controller 210 to interpret error signal 220 in conjunction with one or more other error signals resulting from test signals.

Hot-plug controller 210 may adjust conditions of testing in device interface 230 with signals transmitted via I2C bus 222 and slot bus control 224. For example, in several embodiments, hot-plug controller 210 transmits a signal via I2C bus 222 to control selection of the bus signal associated with device interface 230 between a bus-side bus signal and a slot-side bus signal. The bus-side bus signal is a signal sampled from PCI bus 282 and the slot-side bus signal is a signal sampled from slot PCI bus signals 254.

In many embodiments, hot-plug controller 210 transmits a signal via slot bus control 224 to control the states of FET bus switches 250. For instance, hot-plug controller 210 may transmit a signal via slot bus control 224 to cause FET bus switches 250 to isolate adapter card 270 from PCI bus 282 by turning off or on FETs coupled between PCI bus 282 and slot PCI bus signals 254.

In other embodiments, the actions of hot-plug controller 210 may comprise responses to instructions or commands issued by software such as an applet. In many such embodiments, the applet may receive the error signals or data representing the error signals and interpret the error signals to determine the source of a fault and to generate instructions to isolate the fault such as isolating adapter card 270 from PCI bus 282.

Figure 3:
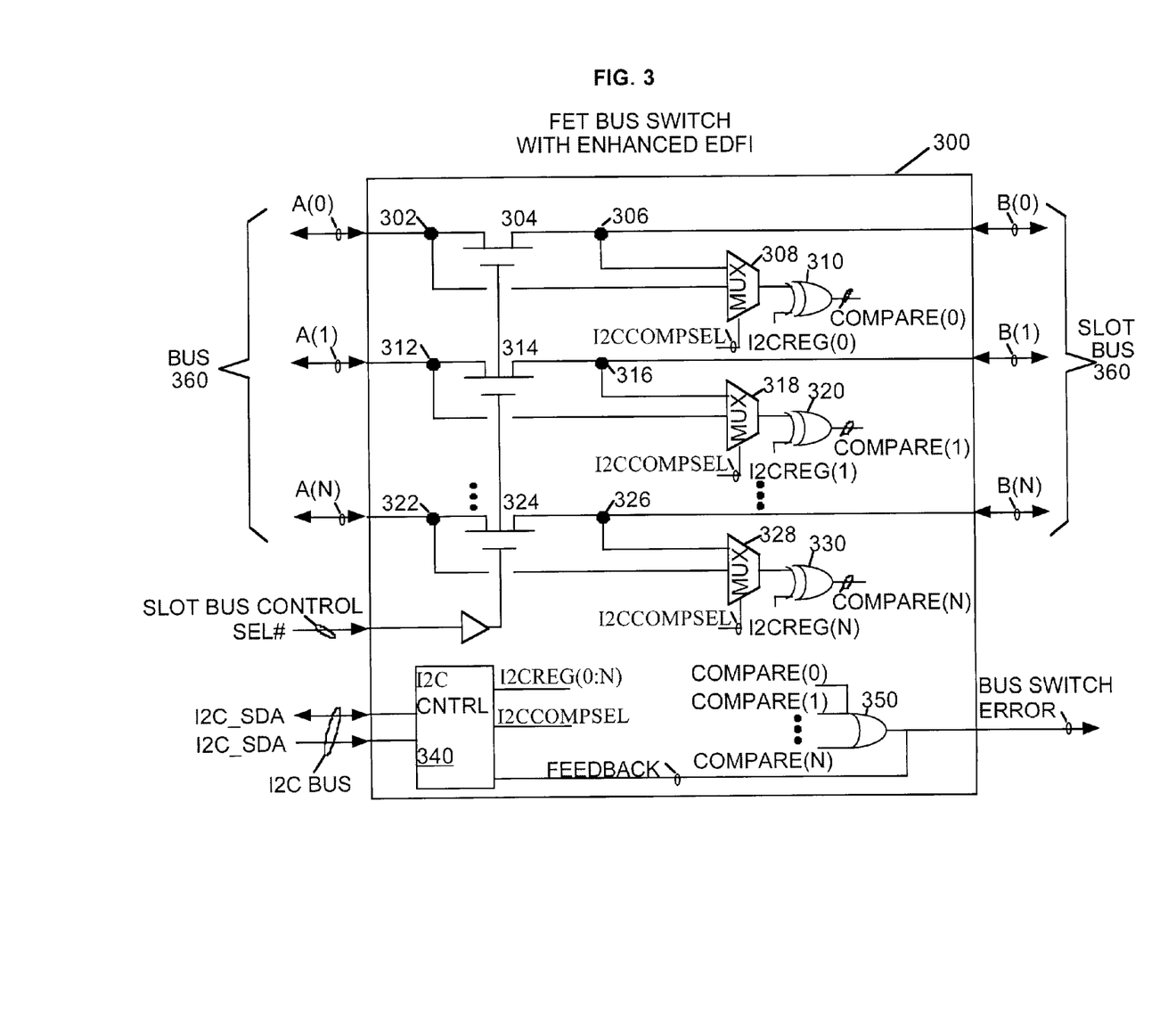
FIG. 3 depicts the embodiment of the bus switch of FIG. 2 to detect errors and/or faults on a bus.

FIG. 3 depicts an embodiment of a bus switch 300 of FET bus switches 250 depicted in FIG. 2 to detect errors and/or faults on a bus such as bus 360 and slot bus 370. Bus switch 300 comprises switches 304, 314, and 324, multiplexers 308, 318, and 328, comparators 310, 320, 330, and 350, and an I2C controller 340. Switches 302, 312, and 324 provide isolation or a coupling between buses 360 and 370 depending upon the slot bus control signal, SEL#. For example, bus 360 may comprise a secondary bus of a system to attach peripheral devices and slot bus 370 may comprise a bus to couple an adapter card in a slot to bus 360 so a controller may transmit a signal, SEL#, to isolate bus 360 from slot bus 370 until slot bus 370 is checked for faults like mechanical misplugging of the adapter card, a fault in the adapter card, a fault with a device coupled with the adapter, or a fault caused during insertion of the adapter card into the slot. In further embodiments, switches 302, 312, and 324 may isolate bus 360 from slot bus 370 for some tests and couple bus 360 to slot bus 370 for other tests.

Multiplexers 308, 318, and 328 may facilitate comparison of bus signals from the bus-side and slot-side of switches 304, 314, and 324. In particular, multiplexers 308, 318, and 328 may couple with nodes 302, 312, and 322 to sample bus-side bus signals A(0), A(1), and A(n) and may couple with nodes 306, 316, and 326 to sample slot-side bus signals B(0), B(1), and B(n). A signal, I2CompSel, from I2C controller 340 may select the bus signals to sample in response to a signal on I2C bus from a controller. In other embodiments, a separate signal for each multiplexer 308, 318, and 328 may facilitate further testing.

Comparators 310, 320, and 330 may compare bits of a data pattern on bus 360 such as a bit on A(0) against a bit, I2C Reg(0) from I2C controller 340 to determine whether a fault is associated with bus 360. For example, a controller generated a test signal and transmitted the test signal to FET bus switch 300 via bus 360. The controller also transmitted a comparison signal, or a signal anticipated to be a response to the test signal at nodes 302, 312, and 322, to I2C controller 340 via I2C bus. In response, I2C controller 340 signals multiplexers 306, 316, and 326 to select the bus-side bus signals and transmits bits the comparison signal, I2C Reg(0:n), to the corresponding comparators 310 through 330, to generate comparison signals Compare(0) through Compare(n). In the present embodiment, the comparators comprise XOR logic to generate a high output when both the bus signal and test signal are low and to generate a low output otherwise.

Comparator 350 combines the outputs of comparators 310, 320, and 330 to generate an error signal, bus switch error. Comparator 350 combines the outputs with AND logic to generate an error signal comprising a logical one or a high output when all the test signals are high and a logical zero or low output otherwise. In some embodiments, the output of comparator 350 may provide feedback to I2C controller 340 to indicate the latency of the logic for generating an error signal.

Figure 4:
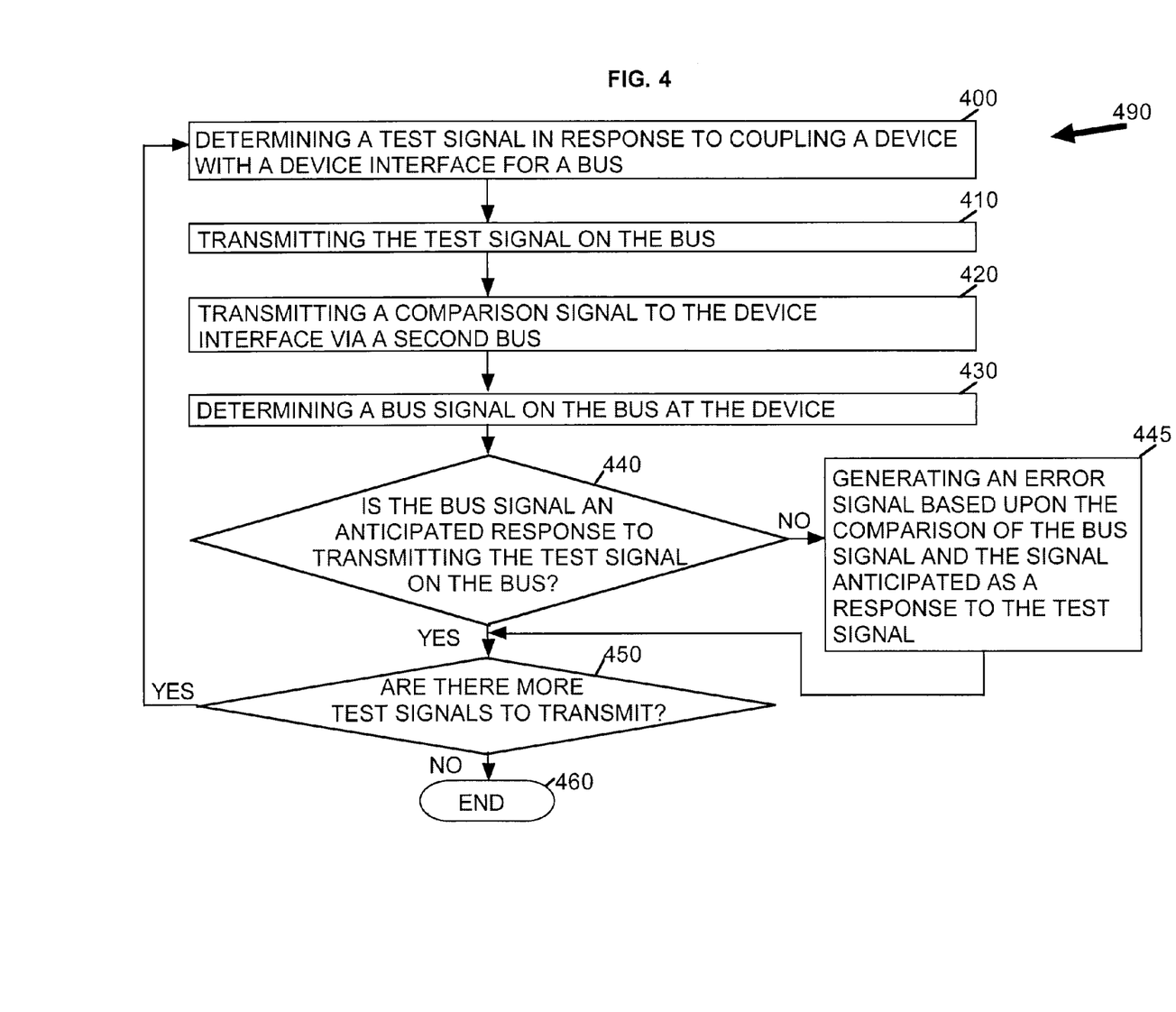
FIG. 4 depicts a flow chart of an embodiment to detect errors and/or faults on a bus.

FIG. 4 illustrates a flow chart of an embodiment to detect errors and/or faults on a bus. The embodiment comprises determining a test signal in response to coupling a device with a device interface for a bus 400. Determining a test signal in response to coupling a device with a device interface for a bus 400 may comprise receiving a pattern of bits or data from an applet. In some embodiments, determining a test signal in response to coupling a device with a device interface for a bus 400 comprises selecting a test signal or pattern of bits configured to identify a fault associated with a bus. For example, a controller may select a test signal to detect a fault on a peripheral bus such as a short or a faultly connector.

After determining the test signal, many embodiments comprise transmitting the test signal on the bus 410 and transmitting the comparison signal to the device interface via a second bus 420. For example, a controller transmits the test signal to a bridge coupled with the bus and the test signal is latched on the output registers of a bridge. The controller also transmits a comparison signal to comparison circuitry of the device interface.

Determining a bus signal on the bus at the device interface after transmitting the test signal 430 reads the signal on the bus at the nodes selected for sampling the bus signal. In some embodiments, determining a bus signal further comprises receiving a signal to indicate the nodes from which to sample the bus signal. For example, the controller may transmit a node selection to a device interface and the device interface may translate the signal into signals for multiplexers for each signal medium of the bus coupled with the device interface. More specifically, the state of each multiplexer may determine whether the bus signal is sampled from the bus-side of the device interface or the slot-side of the device interface. In many embodiments, sampling the bus signal from the bus-side of the device interface may facilitate detection and isolation of a fault in a bus segment between the device interface and the bridge or controller. In several of these embodiments, sampling the bus signal from the slot-side of the device interface may facilitate detection and isolation of a fault associated with an adapter card coupled with a slot of the device interface or a fault associated with a switch, such as a FET of the device interface.

After the test signal and comparison signal are transmitted on the bus and the bus signal is sampled from the bus at the device interface, the bus signal and comparison signal may be compared to determine if a fault exists. When the comparisons indicate that a fault exists, many embodiments comprise generating an error signal based upon a difference between the bus signal and the comparison signal anticipated as a response to transmitting the test signal on the bus 445 to communicate the error to the controller. The controller can interpret the error signals associated with one or more test signal to determine if a fault exists and where the fault is located so the fault can be isolated from the remainder of the system. For instance, when the fault is on a bus segment or a bus switch, the bus may advantageously be disabled to avoid a system-wide crash resulting from an inoperative peripheral bus. On the other hand, when the fault is associated with the adapter card, further tests may indicate whether the fault is associated with buffers or registers of the adapter card, a faulty connection between the adapter card and the slot, or the mechanical insertion of the adapter card into the slot of the device interface. In these later situations, the slot may be isolated from the bus until the fault is corrected or repaired.

In several embodiments, once an error is determined, the error may be displayed to a user in the form of a light coupled with the device interface and/or by interpreting the error signals, and communicating the fault to a user via a graphical user interface (GUI).

Figure 5:
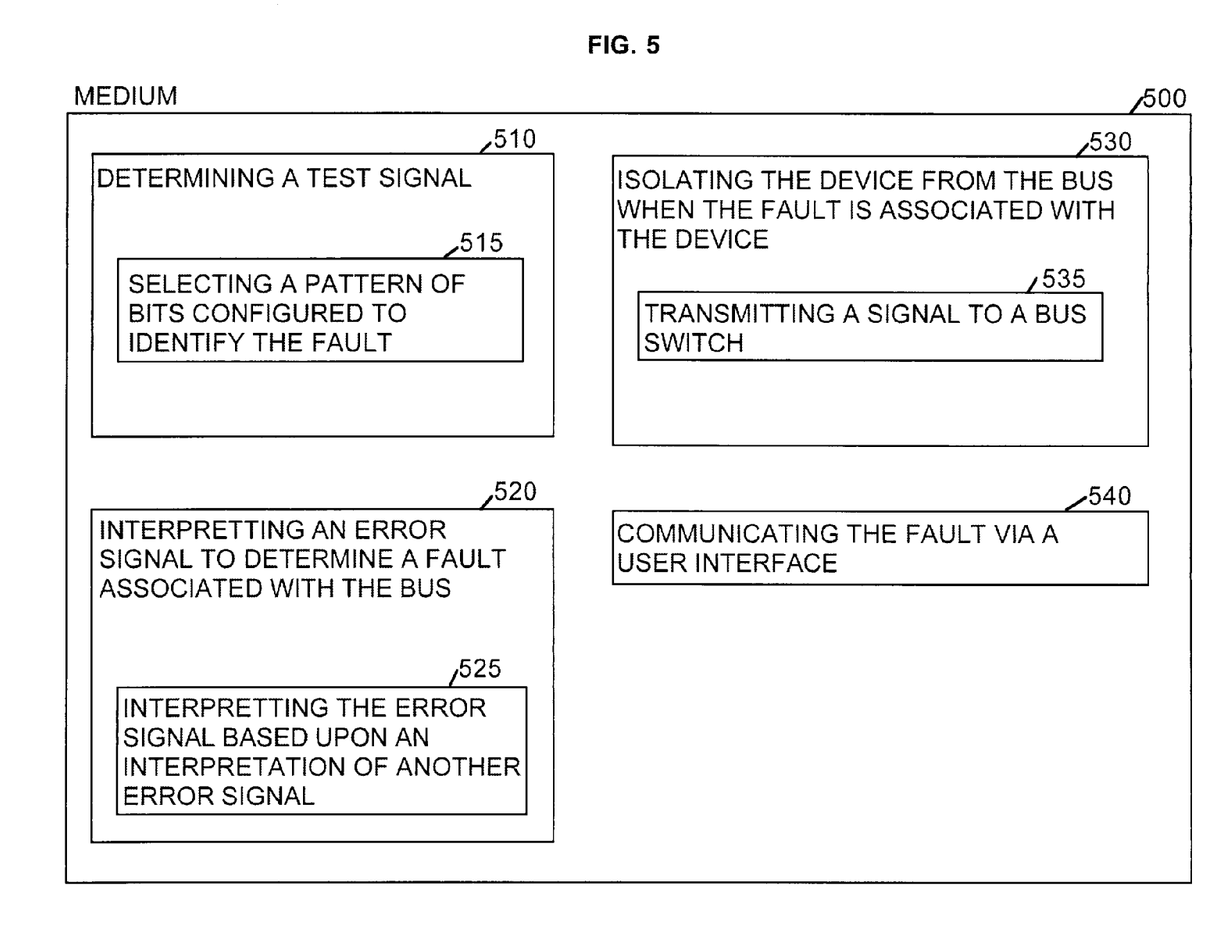
FIG. 5 depicts an embodiment of a machine-accessible medium having instructions for detecting errors and/or faults on a bus.

Referring now to FIG. 5, a machine-accessible medium embodiment of the present invention is shown. A machine-accessible medium includes any mechanism that provides (i.e. stores and or transmits) information in a form readable by a machine (e.g., a computer), that when executed by the machine, can perform the functions described herein. For example, a machine-accessible medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention can comprise more than one machine-accessible medium depending on the design of the machine.

The embodiment 500 may comprise instructions for determining a test signal 510, interpreting an error signal to determine a fault associated with the bus 520, isolating the device from the bus when the fault is associated with the device 530, and communicating the fault via a user interface 540. Determining a test signal 510 may determine a test signal to transmit on a bus in response to coupling a device with a device interface for the bus and may comprise instructions for selecting a pattern of bits configured to identify a fault associated with the bus 515. For example, instructions to determine a test signal may cause a processor to issue one or more diagnostics commands to a controller, setting up different data patterns on a bus segment to determine bus faults.

Interpreting an error signal to determine a fault associated with the bus 520 may interpret an error signal generated in response to transmission of the test signal to determine a fault associated with the bus. Interpreting an error signal to determine a fault associated with the bus 520 may comprise instructions for interpreting the error signal based upon an interpretation of another error signal 525. For instance, after determining the test signal, the test signal may be transmitted to the device interface to determine whether a fault associated with the bus or the device interface causes erroneous bits in the test signal or a response to the test signal from the adapter card. A comparison signal may be transmitted to the device interface from the controller also via a different bus to provide a model of the test signal or correct response to the test signal. The comparison signal can then be compared to the bus signal at the device interface, bit by bit, to determine if an error occurred as a result of a fault. The comparison of the signals can facilitate generation of an error signal and the error signal can be transmitted to the controller. The error signal is then interpreted in light of other error signals resulting from prior diagnostics, if applicable, to determine where the fault may be located.

Isolating the device from the bus when the fault is associated with the device 530 may isolate the device from the bus when an interpretation of the error signal indicates that the fault is associated with the device and may comprise instructions for transmitting a signal to a bus switch 535. Transmitting a signal to a bus switch 535 may transmit a signal to change the state of a FET to isolate an adapter card from the bus. On the other hand, when the fault cannot be isolated by isolating the adapter card such as a faulty FET, the bus may be deactivated until repairs can be made to prevent a system-wide crash.

Further embodiments may comprise communicating the fault via a user interface 540. Communicating the fault via a user interface 540 may comprise instructions to transmit or broadcast a message via the system to indicate the problem to a user. For example, the system may comprise part of a sever and a message may be sent to a administration terminal designed to monitor and/or maintain one or more servers.

It will be apparent to those skilled in the art having the benefit of this disclosure that the present invention contemplates detection and, in some embodiments, isolation of a fault associated with coupling a hot-plug device to a bus in a system that remains in operation, prior to fully activating the hot-plug device and/or the bus associated with the hot-plug device. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. An apparatus, comprising:
   a controller to generate a test signal in response to coupling a device to a bus;
   a bridge responsively coupled with the controller to transmit the test signal on the bus; and
   a device interface to couple the device to the bus and receive a bus signal from the bus and, coupled with the controller and the bridge, to determine an error signal based upon the bus signal and a signal derived from the test signal;
   wherein the device interface comprises a bus switch coupled between the device and the bus to isolate the device from the bus;
   wherein the device interface comprises circuitry coupled with the bus switch to receive a comparison signal from the controller and to compare the comparison signal to the bus signal, wherein the comparison signal comprises a signal anticipated to be the bus signal.

2. The apparatus of claim 1, wherein the controller comprises logic to detect the device after the device is coupled with the device interface.

3. The apparatus of claim 1, wherein the controller comprises circuitry to determine a source of a fault based upon the error signal.

4. The apparatus of claim 3, wherein the controller comprises circuitry to transmit a signal to isolate the source of the fault.

5. The apparatus of claim 1, wherein the circuitry comprises a multiplexer coupled with the bus on a first side and a second side of the bus switch, to determine the bus signal in response to a control signal.

6. The apparatus of claim 1, wherein the logic circuitry comprises comparison circuitry to generate the error signal based upon a comparison of the comparison signal with the bus signal.

7. A system, comprising:
   a controller to generate a test signal in response to coupling a device with a bus;
   a bridge coupled with the controller to transmit the test signal on the bus;
   a device interface to couple the device to the bus and receive a bus signal from the bus and, coupled with the controller and the bridge, to determine an error signal based upon the test signal and the bus signal; and
   a processor coupled with the bridge to communicate with the device;
   wherein the device interface comprises comparison circuitry to generate the error signal based upon comparison of a bit of a comparison signal against a bit of the bus signal, wherein the comparison signal is a bus signal anticipated to be received via the bus in response to transmission of the test signal.

8. The system of claim 7, further comprising a memory device coupled with the bridge.

9. The system of claim 7, wherein the bridge comprises a peripheral component interconnect bridge.

10. The system of claim 7, wherein the device interface comprises a bus switch having a field effect transistor to isolate the bus from the device.

11. The system of claim 7, wherein the comparison circuitry is coupled with the bus on a bus-side of a bus switch to determine the bus signal.

12. The system of claim 7, wherein the comparison circuitry coupled with the bus on a slot-side of a bus switch to determine the bus signal.

13. The system of claim 7, wherein the processor is to instruct the controller to generate the test signal based upon execution of an applet.

14. A machine-readable medium containing instructions, which when executed by a machine, cause said machine to perform operations, comprising:
   determining a test signal to transmit on a bus in response to coupling a device with a device interface for the bus;
   interpreting an error signal generated in response to transmission of the test signal to determine a fault associated with the bus; and
   isolating the device from the bus when an interpretation of the error signal indicates that the fault is associated with the device;
   wherein interpreting an error signal comprises interpreting the error signal based upon an interpretation of another error signal.

15. The machine-accessible medium of claim 14, further comprising communicating the fault via a user interface.

16. The machine-accessible medium of claim 14, wherein determining a test signal comprises selecting a pattern of bits configured to identify the fault.

17. The machine-accessible medium of claim 14, wherein isolating the device comprises transmitting a signal to a bus switch.

18. A method, comprising:
   determining a test signal in response to coupling a device with a device interface for a bus;
   transmitting the test signal on the bus;
   determining a bus signal at the device interface after transmitting the test signal; and generating an error signal based upon a difference between the bus signal and a comparison signal anticipated as a response to transmitting the test signal on the bus;

wherein generating an error signal comprises combining the bus signal and the comparison signal with XOR logic.

19. The method of claim 18, further comprising transmitting the comparison signal to the device interface via a second bus.

20. The method of claim 18, further comprising comparing the bus signal to the comparison signal.

21. The method of claim 18, wherein determining a test signal comprises selecting a pattern of bits configured to identify a fault associated with the bus.

22. The method of claim 18, wherein determining a bus signal comprises determining the bus signal at an input of the device interface to detect a fault on the bus between a bridge and the device interface.

23. The method of claim 18, wherein determining a bus signal comprises determining the bus signal at an output of the device interface to detect a fault associated with the device interface.

* * * * *

UNITED STATES PATENT AND TRADEMARK OFFICE
CERTIFICATE OF CORRECTION

PATENT NO. : 7,069,477 B2  Page 1 of 1
APPLICATION NO. : 10/283994
DATED : June 27, 2006
INVENTOR(S) : Patrick Maurice Bland et al.

It is certified that error appears in the above-identified patent and that said Letters Patent is hereby corrected as shown below:

Title page:
Item (75), Inventors: delete "Jefferey B. Williams" and insert --Jeffrey B. Williams--.

Signed and Sealed this

Thirty-first Day of October, 2006

JON W. DUDAS
*Director of the United States Patent and Trademark Office*